W. L. KAUFMANN.
AUTOMOBILE HEADLIGHT.
APPLICATION FILED SEPT. 21, 1920.
1,412,470.
Patented Apr. 11, 1922.
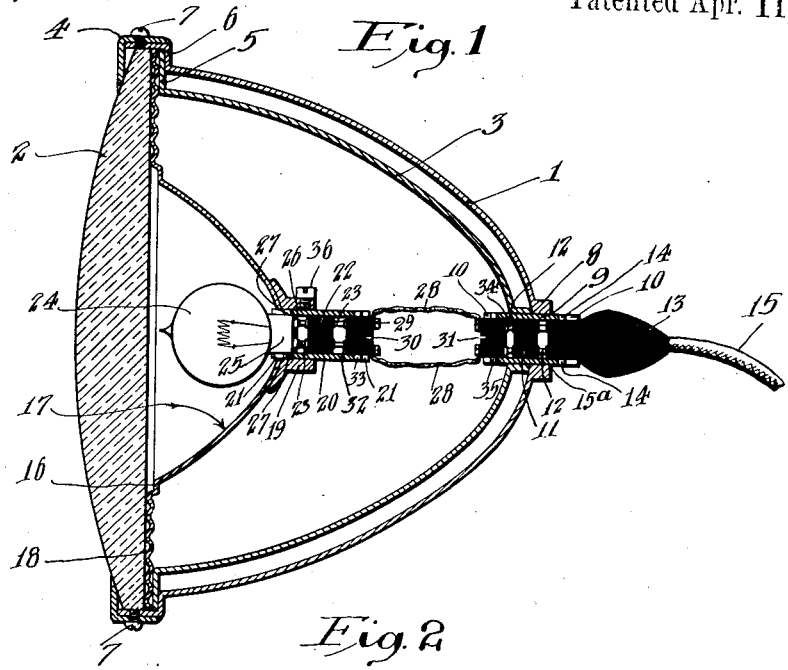
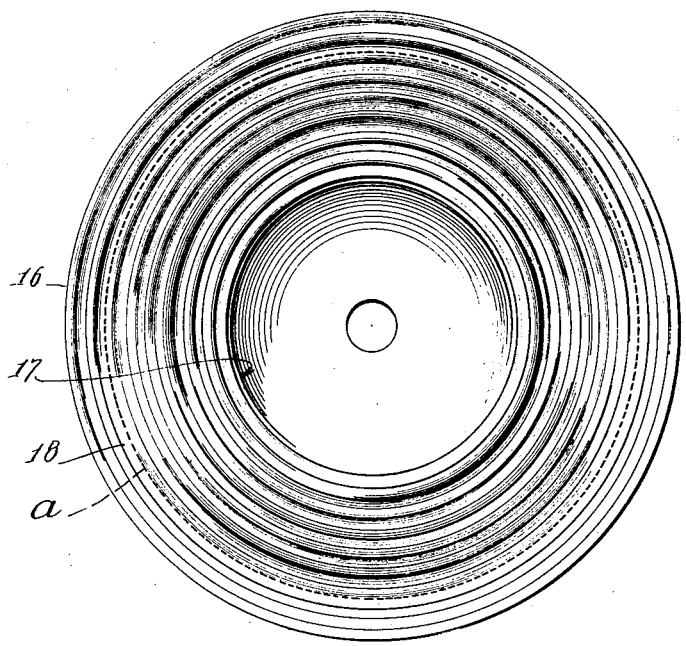
INVENTOR.
Walter L. Kaufmann
BY
Frederick Whyou
ATTORNEY.

UNITED STATES PATENT OFFICE.

WALLER L. KAUFMANN, OF SANTA ANA, CALIFORNIA.

AUTOMOBILE HEADLIGHT.

1,412,470.

Specification of Letters Patent.  Patented Apr. 11, 1922.

Application filed September 21, 1920. Serial No. 411,744.

*To all whom it may concern:*

Be it known that I, WALLER L. KAUFMANN, a citizen of the United States, residing at Santa Ana, in the county of Orange and State of California, have invented new and useful Improvements in Automobile Headlights, of which the following is a specification.

My invention relates to electric lamps or headlights such as are used upon automobiles, and the principal object of the invention is the provision of means for readily increasing the efficiency of automobile headlights by the addition thereto of a "spot reflector".

The efficiency of automobile headlights has been reduced by the enactment of laws compelling the addition of lenses or other provision for the reduction of glare from the headlights. These lenses have in use dimmed the rays cast by the ordinary automobile headlight to such an extent that the roadway in front of the automobile is not sufficiently illuminated. Particularly is this true of the headlights provided with the smaller cars in which type of car it is customary to have the light directly included within a field generated by and during the operation of the motor. A well known type of the latter is the Ford.

The primary reason for the enactment of that type of legislation has been the fact that automobile headlights distribute their rays over such an area that not only is the road in the path of the vehicle illuminated but the headlights also illuminate for some distance above the road thereby blinding the drivers of approaching vehicles. It is desirable to maintain the efficiency of automobile headlights by not decreasing the volume of rays cast therefrom if the same can be accomplished without permitting the distribution of the rays so as to produce the blinding referred to. If a parabolic reflector, materially smaller than those utilized in automobile headlights, with the lamp properly focused at the focal point thereof, be provided the rays can be cast to the point desired without diffusion so as to blind approachers. In other words, if automobile headlights be provided with reflectors, conforming in relative size and focus to the reflectors used in spotlights, headlights can be made to project their beams to certain spots forward of the vehicle and yet not diffuse the same in the objectionable manner above noted. My invention embodies the incorporation in an automobile headlight of a relatively smaller reflector of the spotlight nature so as to convert the headlight from a beam diffusing lamp into a lamp projecting relative pencils of light to relatively confined spots. Thereby the entire volume of light projected from the undimmed lamp may be thrown upon the road in the path of the vehicle and yet the lamp will not diffuse its beams so as to blind an approacher.

One of the important objects of my invention is the provision of means for readily and conveniently converting an automobile headlight of the usual type into the type utilizing a "spot reflector" without the necessity of altering any of the structure of the original headlight. A further object of my invention is to provide means for making the above conversion which means comprises a plurality of parts adapted for use with any standard form of automobile headlight without the necessity of maintaining a plurality of sizes of parts for use with such different sizes of headlights.

A further object of my invention is the provision of an auxiliary "spot reflector" which may be readily and conveniently conformed or trimmed by one unskilled in electrical or mechanical operations for use with an automobile headlight of any standard size.

Other objects and advantages will appear from the following detailed description of a preferred form of my invention.

In the accompanying drawings:

Figure 1 is a central and vertical sectional view of a lamp incorporating my invention.

Fig. 2 is a face view of the preferred form of auxiliary spot reflector included within my invention.

In Figure 1 of the drawings my invention is shown as applied to a standard type of automobile headlight. My invention is not limited in use to application to any particular type of headlight, and it is understood that the type shown is merely by way of example.

The type of headlight of Fig. 1 as ordinarily installed has a casing 1 equipped with a lens 2. A reflector 3 is mounted within the casing 1. The lens 2 is mounted on the casing 1 by means of a securing ring 4, which clamps the lens against an annular flange 5 formed on the reflector 3 and maintains the latter abutting an annular shoulder 6 formed on the casing 1. The ring 4 is held in position by screws 7. A boss 8 extends rearwardly of the casing 1 and is apertured to receive and support a sleeve 9. The sleeve 9 extends from a point at the rear of the casing for a distance within the reflector 3 and is provided at its opposite ends with bayonet slots 10. A plug 11 of insulating material is fitted between the ends of the sleeve 9. The plug 11 is of the well known type utilized in the art and has spring projected contacts 12 at its ends. A plug 13 slips into the outer end of the sleeve 9 and is secured by means of lugs 14 engaging bayonet slots 10. The plug 13 has attached thereto the conductors of a cord 15 and the plug 13 is provided at the end opposite the conductor with a pair of contacts 15$^a$ engageable with the contacts 12. In ordinary use (before the incorporation of my invention) the headlight is illuminated by a lamp (not shown). This lamp has the customary plug fitted within the forward end of the sleeve 9 and provided with contacts to engage the contacts 12 and outstanding lugs to engage the bayonet slots 10.

In use the headlight equipped as above set forth will diffuse its light beams over a relatively large area. This is primarily caused by the relatively large diameter of the reflector 3. Automobile headlights customarily utilize reflectors of approximately the same diameter as the diameter of the headlight casing. To prevent blinding of approachers and to conform to statutory regulations it is customary to equip automobile headlights with various forms of dimmers or lenses to decrease the efficiency or intensity of the beams projected from the headlight. The result is that the road in front of the automobile is not satisfactorily illuminated.

The principal feature of my invention is the incorporation in an automobile headlight of an auxiliary "spot reflector." By "spot reflector" I mean a reflector of such size and so positioned and focused that it will reflect the beams from the headlight in pencil-like paths to pre-determined spots or small areas. Thereby the full volume of the light beams from the headlight may be utilized without dimming and without such diffusion as will endanger the blinding of an approacher.

In Fig. 1 of the drawings there is shown the application of my invention to a preferred form of standard headlight. I provide a "spot reflector" 16 having a relatively small intensified concave reflecting surface 17 surrounded by a relatively wide annular flange 18. The reflector 17 is mounted within the casing 1 of the headlight by inserting the reflector 17 beneath the lens 2. In practice I may either remove the reflector 3 or allow the same to remain in the headlight in incorporating my invention. If the reflector 3 is left in the headlight the outer portion of the flange 18 will be clamped between the lens 2 and the flange 5 of the reflector 3. If the reflector 3 is removed the outer portion of the flange 18 will be clamped between the lens 2 and the shoulder 6 of the casing 1.

To install my invention I remove the lamp ordinarily utilized with the headlight from the forward end of the sleeve 9. I then place the same or a similar lamp between the concavity of the reflector 16 and the lens 2. The reflector 16 is preferably provided with a boss or hub 19 apertured to slidably receive a sleeve 20. The sleeve 20 may be a duplicate of the sleeve 9 and is provided at either end with bayonet slots 21. The plug 22, similar to the plug 11, is inserted within the sleeve 20 intermediate its ends, and has corresponding spring projecting contacts 23. A lamp 24 has its plug 25 inserted within the forward end of the sleeve 20 and is secured with its contacts 26 engaging the spring projected contacts 23 by means of outstanding lugs 27 engaging the bayonet slots 21. The circuit is completed by means of wires 28 secured at their ends to terminals 29 carried by plugs 30 and 31. The plug 30 is inserted within the rear end of the sleeve 20 and is maintained with its contacts 32 engaging the spring projecting contacts 23 by outstanding lugs 33 engaging bayonet slots 21. The plug 31 is inserted within the forward end of the sleeve 9 and is maintained with its contacts 34 engaging spring projected contacts 12 by outstanding lugs 35 engaging the bayonet slots 10. I preferably provide a set screw 36 carried by the boss 19 to bear against the sleeve 20. The sleeve 20 may be adjusted to focus the lamp and is secured in adjusted position by the set screw 36. In practice the lamp 24 is positioned at the focal point of the reflector 16, the concavity 17 of the reflector having the shape ordinarily utilized in spotlights to intensify and project in pencil-like paths the light beams.

Referring particularly to Fig. 2 of the drawings, I preferably provide the flange 18 of the reflector 16 with a plurality of circular corrugations. I contemplate the manufacture of reflectors 16 in quantity, with the diameter of the reflectors great enough to extend across the opening of any standard size of headlight. The purchaser will trim the flange 18 to fit a particular headlight. It is thereby unnecessary to provide a stock of various sized reflectors. To facilitate the trimming to size of the flange 18 I provide the corrugations. The flange 18 may be readily and neatly trimmed by following a corrugation. For example, to trim the reflector in Fig. 2 the same would be cut along the circular corrugation indicated by the dotted line *a*. Thus one unskilled in operations of that character may be assured of a neat and properly fitting product.

The particular arrangement of parts illustrated in Fig. 1 has the advantage of requiring no radical alteration of the original structure of the headlight to incorporate my invention and all of the parts of the original headlight may be utilized with my invention except the reflector 3. While the reflector 3 may or may not remain in the headlight after the incorporation of my invention, in any event, the reflector 3 no longer functions as a reflector. To incorporate my invention in the original headlight, it is only necessary to remove the lens 2, withdraw the lamp, install the spotlight unit above described, make the connections and replace the lens. My invention is not limited to details of construction and the foregoing description has been included merely to describe one desirable arrangement of parts incorporating my invention. The particular form or shape of the headlight to be converted is immaterial as to my invention. For example, my invention is adaptable to headlights having the reflecting surface as a separate unit from the casing equally as well as to headlights having the reflecting surface formed on the inner surface of the casing. Furthermore in place of the parts above referred to, the sleeve 9 and associated parts may be taken out of the original headlight and a sleeve similar to the sleeve 20 but of sufficient length to project through the rear of the casing 1 may be installed within the scope of my invention.

Irrespective of details of form or proportion of parts my invention is of the scope set forth in the appended claims.

I claim:

1. In combination an automobile headlight having a casing and electrical connections to illuminate a lamp within the casing, a splot-reflector having a concave reflecting surface substantially smaller in diameter than the diameter of the forward opening of the headlight casing and a relatively wide flange surrounding the concavity, means to secure said flange to said headlight casing, a lamp unit supported by said spot-reflector, and electrical connections connecting said unit with the electrical connections of the headlight.

2. In combination an automobile headlight having a casing, an electric lamp socket within the casing, electrical connections for said socket, a spot-reflector having a relatively small concave reflecting surface surrounded by a relatively large flange, a lamp socket carried by said spot-reflector, electrical connections connecting said lamp sockets, a lens, and means engaging said lens to clamp the flange of said reflector within the headlight casing.

Signed at Los Angeles, California, this 13th day of September, 1920.

WALLER L. KAUFMANN.

Witnesses:
LEONARD S. LYON,
L. BELLE WEAVER.